US007239871B2

(12) United States Patent
Shamp et al.

(10) Patent No.: US 7,239,871 B2
(45) Date of Patent: Jul. 3, 2007

(54) WIRELESS COMMUNICATION OF CONTEXT SENSITIVE CONTENT, SYSTEMS METHODS AND COMPUTER PROGRAM PRODUCT (75) Inventors: Scott Shamp, Athens, GA (US); Tom Cona, Athens, GA (US); David Boardman, Atlanta, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 129 days.

(21) Appl. No.: 11/214,383

(22) Filed: Aug. 29, 2005

(65) Prior Publication Data
US 2006/0046712 A1    Mar. 2, 2006

Related U.S. Application Data (60) Provisional application No. 60/605,345, filed on Aug. 27, 2004.

(51) Int. Cl.
*H04Q 7/38* (2006.01)
*H04Q 7/20* (2006.01)

(52) U.S. Cl. .............................. 455/422.1; 455/426.1; 455/426.2; 455/414.1; 455/414.2; 455/466; 455/456.3; 455/456.1; 370/328; 370/338; 705/14; 709/218; 709/219; 709/228; 709/229; 709/203; 709/202

(58) Field of Classification Search ............ 455/422.1, 455/426.1, 426.2, 414.1, 414.2, 414.3, 403, 455/406, 407, 408, 456.1, 456.2, 456.3, 500, 455/517, 414.4, 466, 550.1, 552.1; 370/328, 370/338; 705/14; 709/219, 203, 202, 228, 709/229, 239, 218
See application file for complete search history.

(56) References Cited

U.S. PATENT DOCUMENTS 881,943 A   3/1908  Norden
917,386 A   4/1909  Webb
933,075 A   9/1909  Hollingsworth
961,506 A   6/1910  Lokey
971,760 A   10/1910 Lake
1,060,056 A 4/1913  Anderson (Continued)

FOREIGN PATENT DOCUMENTS

WO    WO 02/15076 A1    2/2002

(Continued)

OTHER PUBLICATIONS

Kiwis Graphics, What is a Website Template, Retrieved Aug. 18, 2004 from Internet Site http://www.kiwisgraphics.com, pp. 1-4 (no admission that this constitutes prior art).

(Continued)

Primary Examiner—Keith Ferguson
(74) Attorney, Agent, or Firm—Alston & Bird LLP (57) ABSTRACT The present invention pertains to systems, methods and computer program product that allows businesses, governments and other organizations to quickly and easily develop content in a customizable format that can be delivered within a wireless network. A wireless content delivery engine adapts content to a variety of formats suited to mobile and portable device platforms. More particularly, the present invention provides a structured content system which uses an array of wireless technologies to deliver context (time, location, and people) sensitive information to users in a defined geographic area through one or more wireless technologies including wireless fidelity and wireless telephony.

27 Claims, 7 Drawing Sheets

U.S. PATENT DOCUMENTS

| | | |
|---|---|---|
| 2002/0111154 A1 | 8/2002 | Eldering et al. |
| 2003/0007464 A1 | 1/2003 | Balani |
| 2003/0023726 A1 | 1/2003 | Rice et al. |
| 2003/0028621 A1 | 2/2003 | Furlong et al. |
| 2003/0054844 A1 | 3/2003 | Anvekar et al. |
| 2004/0015567 A1 | 1/2004 | Ziebold et al. |
| 2004/0030746 A1 | 2/2004 | Kavacheri et al. |
| 2004/0031058 A1 | 2/2004 | Reisman |
| 2004/0032393 A1 | 2/2004 | Brandenberg et al. |
| 2004/0088186 A1 | 5/2004 | Anvekar et al. |
| 2004/0137886 A1* | 7/2004 | Ross et al. ............... 455/414.1 |
| 2005/0038876 A1* | 2/2005 | Chaudhuri .................. 709/219 |
| 2006/0040710 A1* | 2/2006 | Ruetschi et al. ............ 455/566 |
| 2006/0058019 A1 | 3/2006 | Chan et al. |

FOREIGN PATENT DOCUMENTS

| | | |
|---|---|---|
| WO | WO 02/067089 A2 | 8/2002 |
| WO | WO 02/067089 A3 | 8/2002 |
| WO | WO 02/095630 A1 | 11/2002 |
| WO | WO 03/001413 A1 | 1/2003 |
| WO | WO 03/001825 A1 | 1/2003 |
| WO | WO 03/090025 A2 | 10/2003 |
| WO | WO 2003/090025 A3 | 10/2003 |

OTHER PUBLICATIONS

Kiwis Graphics, Over 3500 Templates, Retrieved Aug. 18, 2004 from Internet Site http://www.kiwisgraphics.com/templates2go.html, pp. 1-7 (no admission that this constitutes prior art).

* cited by examiner

WIRELESS COMMUNICATION OF CONTEXT SENSITIVE CONTENT, SYSTEMS METHODS AND COMPUTER PROGRAM PRODUCT

CROSS REFERENCE TO RELATED APPLICATION

This application claims the benefit of U.S. Provisional Application No. 60/605,345, filed Aug. 27, 2004, which is incorporated by reference herein in its entirety.

BACKGROUND OF THE INVENTION

1. Field of the Invention

The present invention relates to wireless communications and, in particular, wireless communications utilizing wireless Internet and/or wireless telephony.

2. Description of Related Art

Wireless Internet systems (Wi-Fi) are becoming more and more prevalent as transmit speeds increase and the cost of computers, equipment and service falls. Where wireless "hotspots" were previously confined to a singular office or building (e.g., Starbucks TM coffee shops), wireless clouds now cover much larger geographical areas. However, even with the relative proliferation of wireless Internet, it has repeatedly been shown that there is minimal substantial content to run in these wireless environments (e.g., for instance, the highly publicized recent Wi-Fi events in Paris, France where only a small subset of potential users actually took advantage of Paris's wireless public network due to a lack of useful content). The Paris event involved an experiment to turn the city into one huge Wi-Fi hot spot, making it what could be the first large wireless city in the world. In the experiment, a dozen Wi-Fi antennas were set up outside subway stations along a major north-south bus route, providing Internet access to anyone near them who has a laptop computer or personal desk assistant equipped to receive the signals. The access was at first free, but later required paid subscriptions.

Furthermore, the interaction between wireless Internet technology and that of other "popular" technology such as text messaging as is available over most wireless telephones lags behind the business opportunities for such interaction.

In order for customers to purchase wireless-enabled devices and take advantage of these wireless environments, customers need to have compelling content to run on those devices. Some companies such as Vindigo, Inc. (www.vindigo.com) and CitySearch (720619 Ontario Inc.—www.citysearch.com) are already providing very limited content. These and similar products target the largest cities in America and elsewhere, so many fertile markets are not supported, such as business areas, historic districts, or shopping malls. In addition, these "city specific" applications have very limited content and all content must fit into simplistic templates that typically provide only about one paragraph of information profiling each business and in some instance a non-standard rating of "quality" and/or "cost" is provided. These "city specific" applications typically provide approximately three Internet "pages" per business, generally consisting of a one paragraph profile, contact information, and directions to the venue.

Therefore, what is needed is a systematic method to provide content on a Wi-Fi system and make such content available and useful to the various platforms having Wi-Fi capability and to make use of technologies outside of the Wi-Fi cloud including "wired" Internet and wireless telephony.

SUMMARY THE INVENTION

The embodiments of the present invention pertain to systems, methods and computer program product that allow businesses, governments and other organizations to quickly and easily develop content in a customizable format that can be delivered within a wireless network. A wireless cloud host server adapts content to a variety of formats suited to mobile and portable device platforms. More particularly, embodiments of the present invention provide a structured content system which uses an array of wireless technologies to deliver context (time, location, and people) sensitive information to users in a defined geographic area.

One aspect of the present invention is a wireless communications system comprising a wireless cloud formed of one or more wireless fidelity antennas in a defined geographical area capable of communicating wirelessly with one or more wireless fidelity enabled devices. A wireless cloud host server is in communication with at least the wireless cloud and has an Internet connection. A cellular gateway provides communication between a wireless telephony network and wireless telephony devices and the Internet. The wireless cloud host server executes a modified chat bot computer program product that manages communication between the wireless telephony devices and the wireless fidelity enabled devices by communicating with said wireless telephony devices in the form of text messaging and by communicating with said wireless fidelity enabled devices in the form of web pages.

Another aspect of the present invention is a computer program product comprised of executable code that is operating on a processor of a computer. The computer program product is comprised of at least first and second executable portions. The first executable portion operating on the processor determines whether a user is logged on to a wireless cloud network with a wireless fidelity enabled device and, if so, communication is routed to said wireless fidelity enabled device in the form of a web page, else communication is routed to a wireless telephony device associated with said user in the form of a text message. The second executable portion operating on the processor receives and stores certain user profile information including the user's telephone number and location in a database associated with the computer and provides said information to authorized users upon request. The information is provided in the form of web pages or text messages, depending upon whether the authorized user is logged on to the wireless cloud network or not.

Another aspect of the present invention is a method of providing content in a wireless communication network. This method is comprised of the steps of establishing a wireless cloud network by an environment manager, wherein the wireless cloud network includes a host server and the host server executes a modified chat bot computer program product. The method also comprises the step of providing one or more content templates that are accessible via the wireless cloud network, wherein the content templates enable a content provider to customize one or more web pages of content information that is available over the wireless cloud network and said web pages contain content information relevant to said content provider and storing said templates and said content information in a memory area associated with the host server. The method further comprises formatting the content information such that it may be displayed on more than one wireless fidelity enabled platform. The content information is matched with one or more end-users that have indicated an interest in the content information in a user profile established on the host server. The method comprises determining an appropriate format for the wireless fidelity enabled platform corresponding to the one or more end users and obtaining the appropriately formatted content information that corresponds to the determined platform. Another step in the method is transmitting the content information to the one or more end users.

Yet another aspect of the present invention is a method of using wireless templates in providing content in wireless cloud networks. This method comprises the step of providing prefabricated templates that are accessible over a network, wherein the prefabricated templates are comprised of one or more of primary templates, secondary templates, and communication features. The method further comprises receiving from content providers that are located within the geographical coverage area of a wireless cloud network the content to form populated prefabricated templates. The method comprises the step of providing an end-user graphical user interface capable of operating on various platforms and capable of presenting in a designated format at least a portion of the content of a populated prefabricated template, wherein the information is received by the platform via the wireless cloud network. At least a portion of the content from the populated prefabricated templates is provided to wireless fidelity enabled devices associated with end users of the wireless cloud network based on the current location of the end user or the current time of day.

These and more aspects of the present invention are described more fully herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Block Diagrams, Flow Charts and Computer Program Product

The present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

The embodiments of the present invention pertain to systems, methods and computer program product that allow businesses, governments and other organizations to quickly and easily develop content in a customizable format that can be delivered within a wireless network. A wireless cloud host server adapts content to a variety of formats suited to mobile and portable device platforms as well as performing a number of other functions. It is to be noted that the wireless content host server, while referred to in the singular, may in fact be one or more servers that are located together or distributed at various locations. More particularly, embodiments of the present invention provide a structured content system which uses an array of wireless technologies including Wi-Fi and/or wireless telephony technology to deliver context (time, location, and people) sensitive information to users within and without a defined geographic area.

Computer and Computer Hardware

Figure 1A:
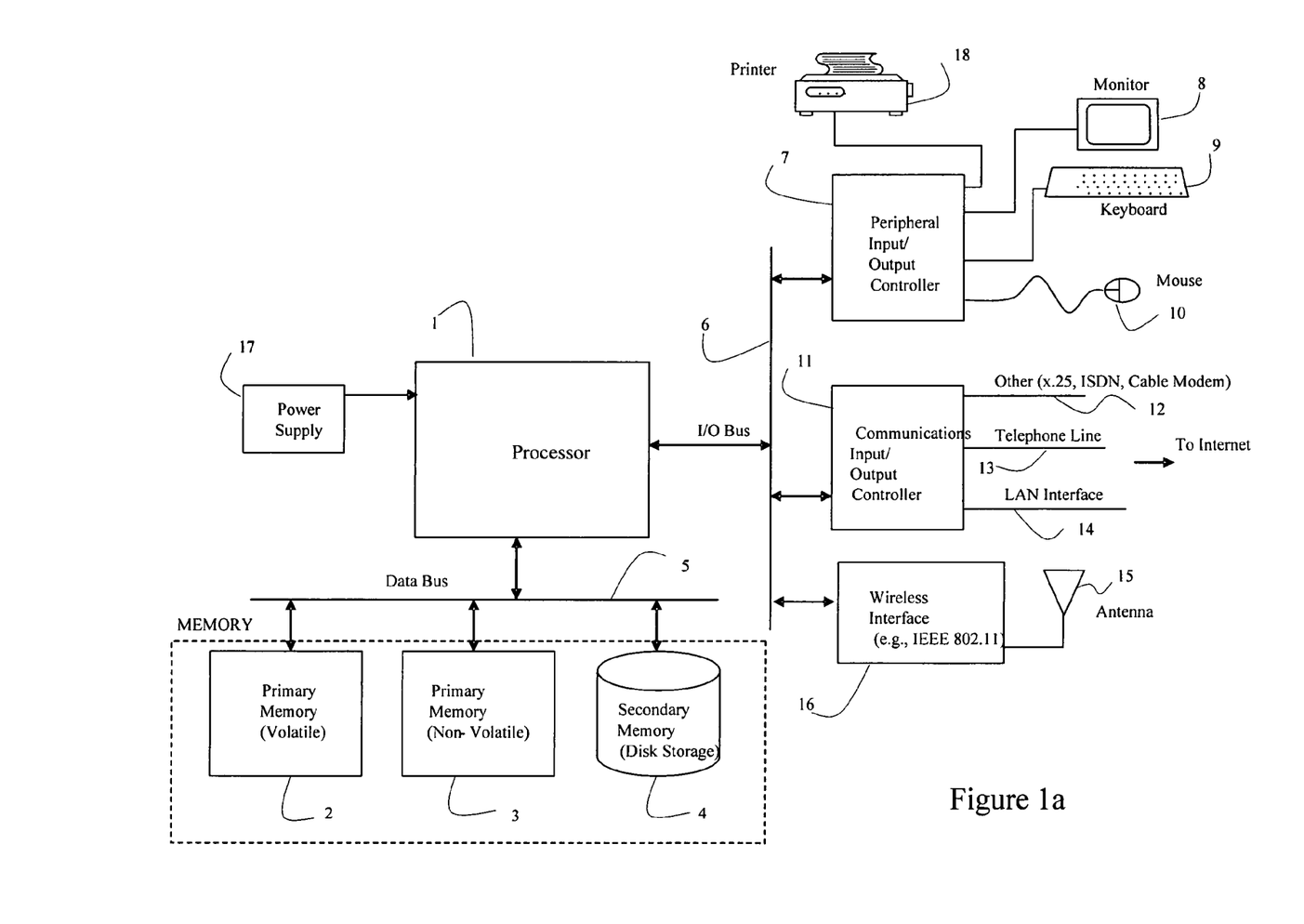
FIG. 1a is an illustration of an embodiment of a computer that can be used to practice aspects of the present invention.

In several of the embodiments of the invention referenced herein, a "computer" is referenced. The computer may be, for example, a mainframe, desktop, notebook or laptop, hand-held, hand held device such as a data acquisition and storage device, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16, 32, 64 or more bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, cellular (Advanced Mobile Phone Service or "AMPS"), Personal Communication Services (PCS), or a standard 3G wireless telecommunications protocols, such as CDMA2000 1x EV-DO, GPRS, W-CDMA, or other protocol.

Figure 1B:
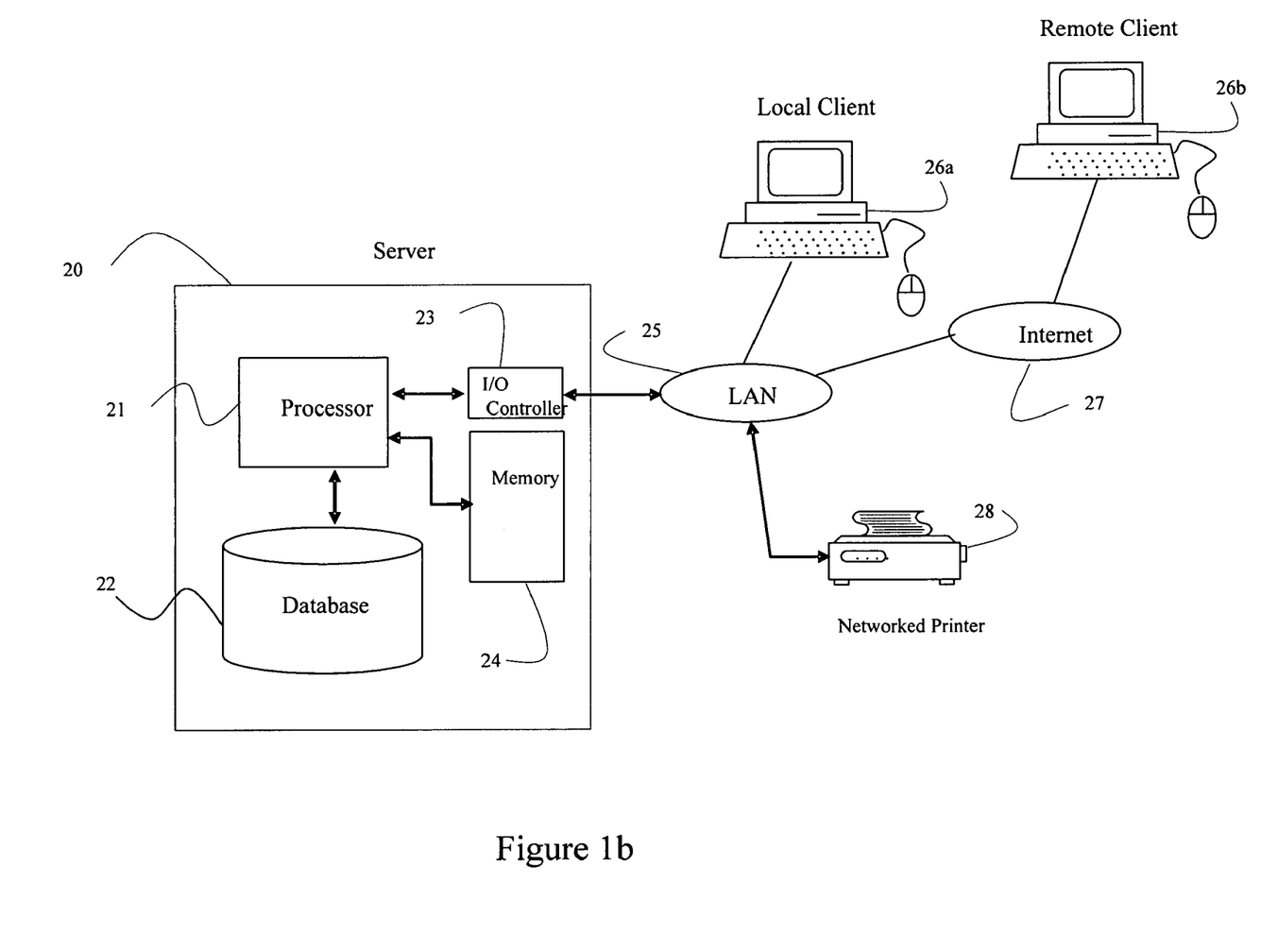
FIG. 1b is an alternative embodiment of the processing system of FIG. 1a that also may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible such as, for example, the handheld devices contemplated herein and can be used to practice the principles of the present invention. The embodiments illustrated in FIGS. 1a and 1b can be modified in different ways and be within the scope of the present invention as claimed.

Wireless Fidelity (Wi-Fi)

Wireless fidelity (Wi-Fi) is generally used to define any of the wireless technology in the IEEE 802.11 specification—including (but not necessarily limited to) the wireless protocols 802.11a, 802.11b, and 802.11g, all of which are incorporated herein and made a part hereof, and also including 802.15.4 protocol, and wireless telephony protocols such as cellular (Advanced Mobile Phone Service or "AMPS"), Personal Communication Services (PCS), or a standard 3G wireless telecommunications protocols, such as CDMA2000 1x EV-DO, GPRS, W-CDMA, or other protocols that are developed are contemplated within the scope of this invention. The term "cellular" may be used as either and adjective or a noun herein in reference to all wireless telephony and it is to be recognized that such use does not limit the term to only analog or AMPS protocols and standards but contemplates the inclusion of all wireless telephony protocols and standards.

The Wi-Fi Alliance is the body responsible for promoting the term and its association with various wireless technology standards. Wi-Fi and other wireless environments are appearing all over the USA and the world such as, for example, the wireless "HotSpots" found in Starbucks TM coffee shops. However, it has repeatedly been shown that there is minimal useful content to run in these wireless environments (e.g., for instance, the highly publicized recent Wi-Fi events in Paris, France where only a small subset of potential users actually took advantage of Paris's wireless public network due to a lack of useful content). The Paris event involved an experiment to turn the city into one huge Wi-Fi hot spot, making it what could be the first large wireless city in the world. In the experiment, a dozen Wi-Fi antennas were set up outside subway stations along a major north-south bus route, providing Internet access to anyone near them who has a laptop computer or personal desk assistant equipped to receive the signals. The access was at first free, but later required paid subscriptions.

Embodiments of a System of the Present Invention

Figure 2:
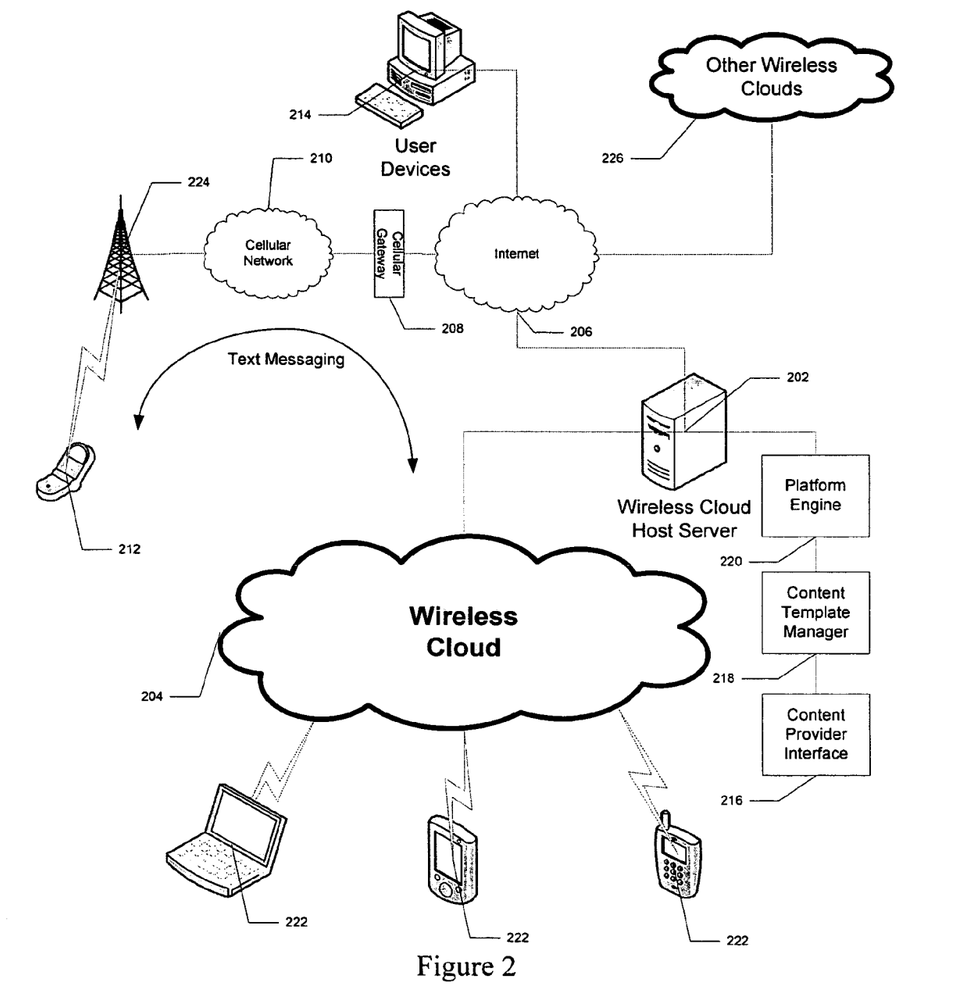
FIG. 2 illustrates an embodiment of a wireless cloud system that may be used to practice aspects of the invention.

FIG. 2 illustrates an embodiment of a system that may be used to practice the invention, though it is contemplated that there are numerous other embodiments of systems that can be used. In FIG. 2, a wireless cloud host server 202 operating, for example, a Linux operating system, though other operating systems are contemplated within the scope of the invention, is connected with a Wi-Fi wireless cloud network (or just "wireless cloud") 204, as such networks are known in the art. The wireless cloud 204 is capable of communicating with any number of Wi-Fi enabled devices 222, which may include computers (whether laptop, notebook, desk top, etc.), personal digital assistants (PDAs) and their progeny, wireless telephones having Wi-Fi capability, etc. As shown in FIG. 2, the wireless cloud host server also provides the interface 216 for content providers (e.g., businesses, government, art and other museums, etc.) to provide their content to the wireless cloud 204 (and indirectly the Internet 206 and cellular networks 210). A content provider accesses the wireless cloud host server 202 through the wireless cloud 204 using Wi-Fi, or through the a "wired" Internet connection. A user interface 216 running on the server 202 allows the content provider to access a content template manager 218. The content template manager is software running on the server 202 that interacts with the content manager through a series of questions for which the content provider provides answers. This is further described herein. Through this interaction, the content provider "builds" a presence for the content provider within the wireless cloud 204, and the Internet. Once the information is provided to the content template manager 218 by the content provider, then a platform engine 220 formats the information into templates for the various platforms that may access the information through the wireless cloud 204 or the Internet. The various templates are then stored on the server 202 or memory devices (not shown) associated with the server 202.

The wireless cloud host server 202 is also connected to the Internet 206. A feature of the Internet that is supported by most wireless telephony providers is a gateway 208 that allows communication between the wireless telephony provider's network (a/k/a a "cellular network") 210 and the Internet 206. Such a gateway 208 facilitates the transfer of information (such as, for example, email, text messaging, web-browsing, etc.) between the cellular network 210 and user's wireless devices 212 on the cellular network and the Internet 206 and user devices 214 on the Internet 206. Furthermore, in an embodiment of the invention, a message sent to a cell phone or other cellular device 212 from a Wi-Fi device 222 logged into the wireless cloud network 204 would first go through the server 202 and out onto the internet 206. The gateway 208 would then route the message from the Internet 206 to the cellular network 210 to a cellular tower/antenna 224 and ultimately to the cellular device 212. Likewise, a message sent from a cellular device 212 directed to a user would be routed through the cellular network 210 and the gateway 208 and to the Internet 206. The message would then be routed to the wireless cloud host server 202, where it would be determined whether the user was logged into the wireless cloud 204 with a Wi-Fi enabled device 222 that corresponds to the user. If so, then the message is delivered to the user's Wi-Fi device. If the user is not logged into the wireless cloud 204, then software executing on the server determines if the user is logged into the Internet 206 or logged into any other wireless clouds 226, and then routes the message appropriately. If the user does not have any device logged into the Internet or any wireless cloud, then the message may be routed to a user's cellular device through that user's cellular network (assuming it has a gateway to the Internet) where the user may receive the message or it may be stored on the cellular network until such time the user retrieves the message. Likewise, the message may be stored onto the wireless cloud host server 202 in an embodiment of the invention until such time as the user logs into the wireless cloud 204. A person logged-in to the Internet 206, but at a location outside the wireless cloud's 204 coverage using a user device 214 wouldn't be on the wireless cloud 204, so a message intended for the cellular device 212 would be sent via the Internet 206 to the gateway 208 and ultimately to the cellular device 212.

An Exemplary Wireless Cloud Host Server

Figure 3:
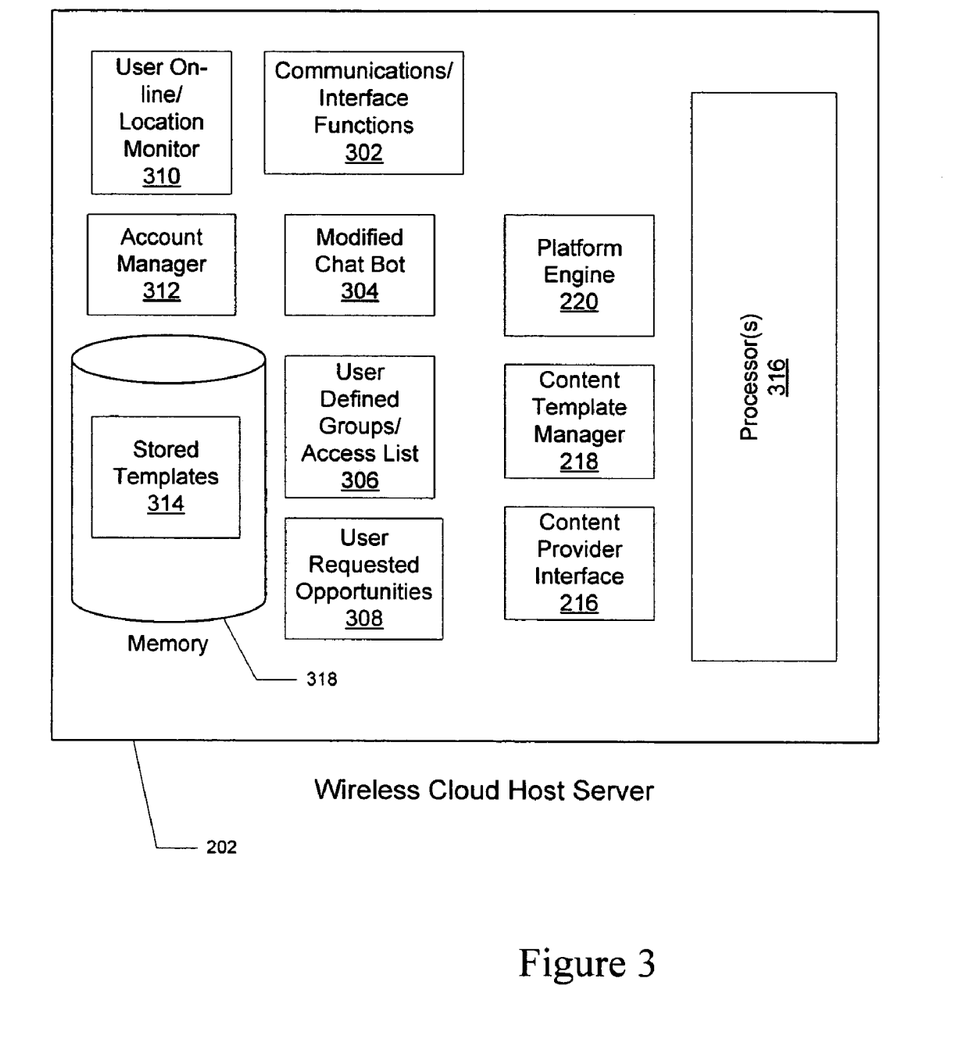
FIG. 3 is a more detailed view of an embodiment of a wireless cloud host server that may be used to practice aspects of the present invention.

One component of the system of FIG. 2 is the wireless cloud host server 202, which is a computer having associated memory storage capability (may be separate from the server) and processing capabilities. FIG. 3 is a more detailed view of an exemplary wireless cloud host server 202 that may be used to practice one or more embodiments of the present invention. In FIG. 3, several modules that reside and/or execute on the server are shown, though in other embodiments there may be more, less or different modules. In the embodiment of FIG. 3, there is a content provider interface module 216, a content template manager 218, and a platform engine 220, each of which were discussed in relation to FIG. 2, above. There are also, in this embodiment, a communications/interface functions module 302, a modified chat bot module 304, a user defined groups/access list module 306, a user requested opportunities module 308, a user on-line/location monitor module 310 and an account manager 312. The server 202 also has memory capability 318 (as described above) where at least stored templates 314 for providing content and information to various platforms are stored, and processing capability comprised of one or more computer processors 316 for executing at least the described modules.

The communications/interface functions module 302 provides an interface for the server to the Internet 206 and the wireless cloud 204 and facilitates communication between the two. The modified chat bot 304, though discussed in greater detail below, is a software application that allows users to interact with the server in much the same way that they would interact with another user. For example, a user (Bob) may send a text message to the chat bot 304 from the user's cellular device 212 or Wi-Fi device 222 stating, for example, "Bob@SkyBlue_Cafe." The chat bot 304 would acknowledge receipt of the message and then store the information in the user's on-line/location monitor function module 310. Another user (Mark) would then send a text message to the chat bot 304 requesting the location of Bob. The chat bot 304 will check with Bob's user defined groups/access list module 306 to see if Mark is provided access to Bob's user on-line/location monitor 310. If Mark is allowed access, then the chat bot 304 will send a message (text, audio, video, etc.) to Mark indicating that Bob is at the SkyBlue Café. Mark may also be provided information indicating whether or not Bob is logged on to the wireless cloud or the Internet. The user requested opportunities module 308 allows a user to indicate their interests and/or preferences for "opportunities" offered by content providers within the wireless cloud 204. "Opportunities" are special offerings by content providers such as discounted food, tickets, etc. They may be time and/or location dependent. Users have the ability to indicate their interest in various categories of content providers (e.g., food, shopping, art, entertainment, etc.) and whether they want to receive opportunities from content providers in these areas. The user may turn this feature on or off, at their discretion, for each classification of content provider through the use of the user requested opportunities module 308. The user on-line/location monitor 310 was briefly discussed, above. It stores and monitors location information about registered users of a wireless cloud 204, including whether such a user is on-line (in the cloud), logged on to the Internet, not logged on to the cloud or the Internet or the cloud, or stores, updates and monitors user-provided location information (e.g., Bob@SkyBlue-Cafe). The user on-line/location monitor works in concert with the user defined groups/access list 306 and the modified chat bot 304, as described above. The account manager module 312 allows a user to define and/or manipulate certain parameters of their wireless cloud account such as, for example, passwords and usernames, authorized users of their account, payment and billing information, etc.

EXAMPLE

Now referring back to FIG. 2, an exemplary use of the above-described embodiment of a system of the present invention would be a user at a coffeehouse, for example the CH123 coffeehouse, with the user having a Wi-Fi enabled device such as, for example, a laptop 222, and the user has the laptop opened and the user has logged into the Wi-Fi cloud 204 and has entered a profile indicating that the user wants to be notified of locally-available lunch offers between 11-11:30 a.m., because that's when the user is going to make their decision about where they are going to go eat lunch. The cloud system 204 detects that the user is using Wi-Fi because the user is logged into the wireless cloud 204. So, while the user is doing work on their computer, at 11:00 a.m. a screen will display on the user's computer and provide lunchtime specials for restaurants (lunchtime specials at restaurants is an example of an "opportunity") within the coverage area of the wireless cloud 204. In another embodiment, consider a user that is not logged into the wireless cloud 204, in which case the server 202 of the wireless network 204 would detect that the user is not logged into the wireless cloud and be capable of contacting the user via their wireless telephony device, in this instance a cell phone 212, and send out a text message to their phone 212, which rings or otherwise alerts the user and it will then notify such user of the opportunities for lunch at the restaurants within the coverage area of the wireless cloud.

If a user is not logged into the wireless cloud 204 with a Wi-Fi device 222 and the user's profile as stored on the wireless cloud host server 202 indicates the user has a cellular device 212 and/or an IP address, then information from the wireless network's server 202 will send the user information over a cellular device (e.g., cell phone) 22 via a cellular system 210 or it will be routed to an appropriate IP address to a user device 214 over the Internet. As described above, the server 202 that comprises a portion of the wireless cloud network operates one or more computer program products such as, for example, the modified "chat bot" application 304 that, among other functions, sends out the messages and processes incoming information and sends out webpages to specified devices.

Wireless clouds may be developed for various cities, locations, geographic areas, parks, malls, museums, etc. For example, there could be a wireless cloud at Athens, Ga. However, a user may know that they were going to be visiting Charleston, S. C. and there is a wireless cloud at Charleston. The user could log-on to the cloud in Athens, then log-on to the cloud at Charleston as accessed through the Internet and set their profile such that the system(s) know that the user is going to be in Charleston from Monday thru Wednesday. So, instead of sending the user messages of lunch opportunities in Athens, the system will send the user lunch opportunities in Charleston. It would push the opportunities it to the user's cell phone while the user was in Charleston or to the user's laptop, if the user was on the wireless cloud network in Charleston.

Therefore, it is shown in embodiments of the invention that a profile can be established on one or more wireless cloud host servers for a user or users that includes certain parameters such as location, telephone number, time-based triggers (e.g., lunch opportunities between 11 and 11:30), how many messages a user wants to receive (e.g., a user can request another user such as a business or another person to only send the user one of a certain message a day, etc.), and demographic information may be collected and stored in a profile for directed messaging (e.g., advertising and offers).

In one embodiment the wireless cloud concept is used by businesses operating within the wireless cloud 204 (i.e., local advertisers) because local advertisers are able to reach people who are in the cloud's geographic area with a message at a certain period of time and with information that can be customized seconds before it is sent out. For example, a business called, for example, "CC Cookies & Company" perhaps made too many cookies on a particular day. So, now the company wants to sell these excess cookies and therefore might send out a special opportunity over the wireless cloud 204 to get people to come in and buy those cookies or give them other forms of incentive offers. In one embodiment, such information would be provided to those users based on requirements that the user has put in a profile associated with the wireless cloud host server 202. For example if the user stored in their profile for the wireless cloud system to send only one opportunity, and the system's already sent the user one—the system is unable to contact the user again. In various embodiments of the invention, a user may include in their profile directions to the wireless cloud system to the effect the system is to only send information about French food or only information about alcoholic drinks or whatever else the user has indicated a specific interest (this is a way of directing information to users most interested in that certain information).

The wireless network (cloud) in various embodiments may have one or more broad categories (areas) such as, for example, food, entertainment, retail, (e.g., men's apparel, women's apparel, etc.), public areas such as government announcements and offices, art galleries, libraries, announcements about happenings or events, etc., as discussed in more detail, below.

Templates and Content

Embodiments of the present invention provide more robust pre-fabricated templates that allow businesses, etc. to define and organize a multi-level, multi-page website, as well as to specify the content that populates the pre-fabricated templates. The embodiments of the present invention provides generic page templates that cover businesses that fall under such categories as, for example, Food, Art, Shopping, etc. Additionally, secondary templates are provided for functionality that is not business-specific, such as, for example, Festivals, City Services, Maps, Walking Tours, Transportation, and communication features such as peoplefinders, chat, and Voice-over-Internet Protocol (VoIP).

Embodiments of the present invention leverage the unique aspects of a wireless cloud network by providing content that is based on the current location of the end user or the current time of day. Other content is optionally available, depending on the needs of the business owner and/or the end user. For example, in one instance location-based coupons are presented to a user if the user walks within a certain distance of a store. In another instance, time-based content (e.g., "Hot Dogs on Sale at Frank's Dog Haus for the Next 20 Minutes!") is available to users of a wireless cloud network only for a limited amount of time, after which they no longer appear on the wireless cloud network. In one embodiment, end users personalize the content that is presented to them by requesting that only certain types of information be presented, such as disabling all Shopping information except for women's wear. Or the end user selects from optional enhanced features, such as "notify me 10 minutes before my parking meter expires." Other flexible features allow a business owner to include advertisements on the topmost levels (Food, Shopping, Art, etc.) of a site, or the business owner could chose to have basic pages or enhanced detail pages. Also included are robust search and online help applications for users of the wireless cloud network.

Figure 4:
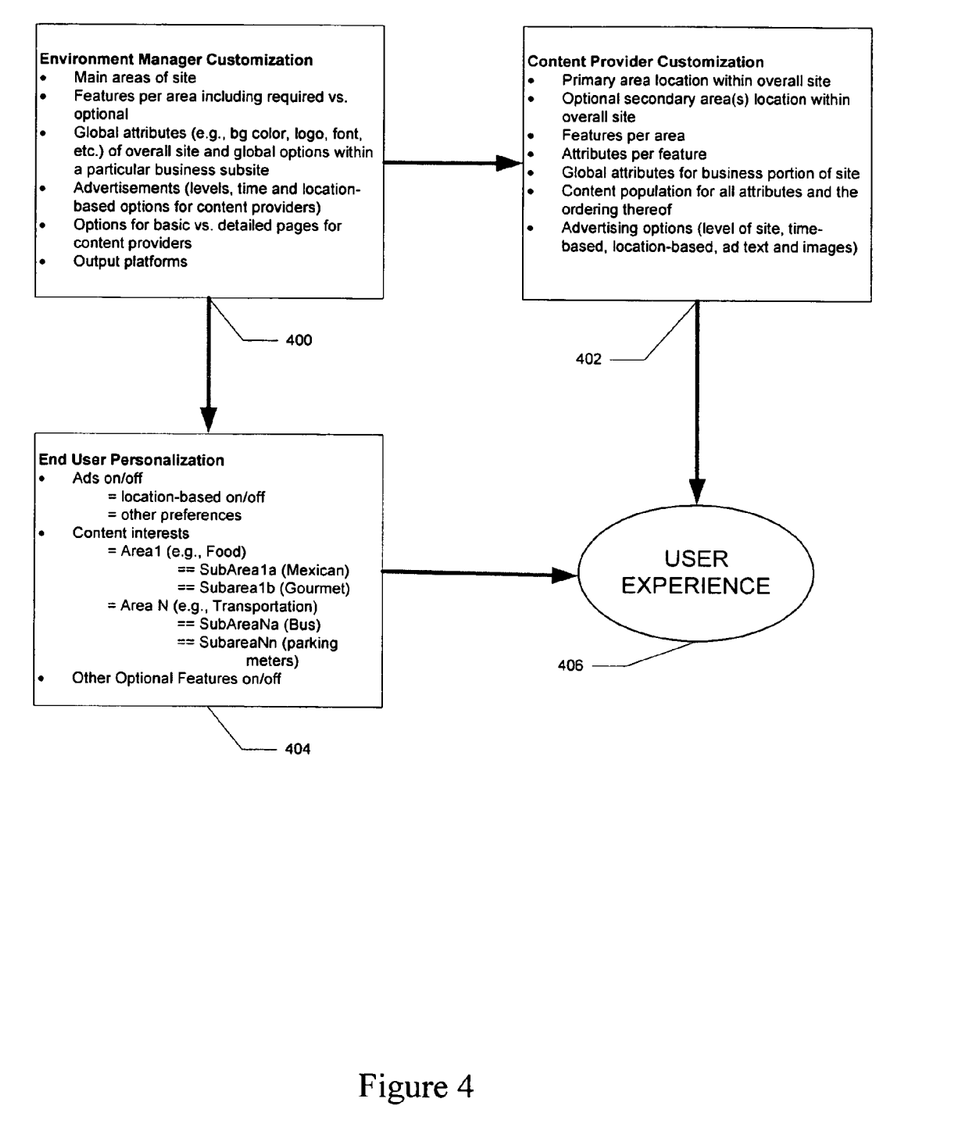
FIG. 4 is an exemplary block diagram of the interrelation of various entities that comprise a wireless cloud environment, in an embodiment of the present invention.

FIG. 4 is an exemplary illustration of the interrelation of the various entities that comprise a wireless cloud environment, in an embodiment of the present invention. For example, management, government, and other organizations (i.e., the "environment manager") that represent a wireless environment (as opposed to the businesses that reside within the environment) have the ability to customize content at the highest levels of a wireless cloud network such as, for example, determining the highest level categories of a site (Food, Shopping, etc.), designing pre-fabricated templates for content providers within the various high-level categories such as, for example, deciding whether to include a Maps section or whether there will be Hours of Operation in each Restaurant template.

Customization of the pre-fabricated templates takes place through an easy-to-use graphical user interface (GUI) 216. Environment managers and business owners interact with forms that represent the options for particular pages or sets of pages. By typing text and selecting options on the customization forms, the system automatically applies those options and creates web pages based on the pre-defined templates. The customization GUI is provided through, for example, HTML, Flash, and/or Visual Basic, as well as other potential platforms.

The end users for these applications are potential customers of the businesses that provide content on the wireless network. The end users are provided with such content as they access the network or as they walk around in the wireless cloud environment. The end users interact with an easy-to-use GUI which includes the content customized by environment management and business owners. This GUI could run on a variety of platforms, including personal digital assistants (PDAs) (such as PocketPC and Palm), SmartPhones, cell phones, and 800 pixel wide personal computers, laptops, kiosks, and Tablet PCs, etc. Environment managers and business owners can customize the content and/or modify such content in only one location, and it will be automatically presented on whatever platform(s) are required for that particular environment.

Referring to FIG. 4, the environment manager provides customizing features for the overall site and pre-fabricated content templates. As shown in block 400, these features include: determining the main areas of a site; the features in each area, including which features are optional and which are required; the attributes for each feature, including which attributes are optional and which are required; the global attributes of the site, such as background color, logo, font(s), etc. and the global options within particular business sub-sites; advertisements (including levels, time and location based options for business owners, etc.); options for basic versus detailed pages for business owners; and output platforms; etc. Block 402 describes the customization features for a content provider (e.g., an individual business owner) in the wireless network. The features include: determining the primary area location (e.g., food, art, shopping, retail, etc.) within the overall site in which their content resides; determining optional secondary area(s) (e.g., food, art, retail, shopping, etc.) within the overall site in which to list their content; determining the features for each area; determining the global attributes for the business portion of the site; populating the content for the attributes and assigning attributes; determining the advertising options, including the level of the site, time-based ads, location-based ads, ad text and images); etc. Block 404 describes end-user personalization features. These features include: determining ads that will be allowed to be transmitted to the user or not allowed ("on/off"), including whether location-based ads will be allowed and other preferences regarding ads. The end-user may also establish content interests. For example, the end-user may select an area for which they have an interest (e.g., food), and select two sub-areas under the "food" area such as "Mexican" and "gourmet," so the end-user receives content related to these interests. Similarly, the end-user may choose additional areas and sub-areas of interest, as shown in block 404. The end-user may also determine optional features (preferences) that may be customized for the content they receive. The actions, content specification and customization of the environment manager, content provider(s), and end user(s) all converge to result in the experience enjoyed by a user of the wireless cloud network, as shown in Block 406 of FIG. 4.

In one embodiment, the pre-defined templates of a wireless cloud environment may have an hierarchically organized structure and be established in the exemplary structure shown, where the highest level categories are designated with Roman numerals and the related sub-categories are shown underneath:

I. FOOD
  a. menu
    i. category (e.g., breakfast, vegetables)
      1. items
        a. name
        b. price
        c. photo
        d. description
      2. seasonal or daily specials
        a. items
      3. reservations
        a. number in party
        b. (non) smoking
        c. section
        d. date/time
        e. ping me when ready: on/off
  b. contact information
  c. hours, accepted payment methods
  d. exterior photo
  e. history/about
  f. type of restaurant (Mexican, gourmet, buffet, etc.)

II. SHOPPING
  a. seasonal
  b. categories of inventory/items
    i. item details
      1. name
      2. price
      3. brand
      4. photo
      5. description
  c. areas in store
    i. items within
    ii. map
    iii. interior photos
  d. highlighted artists
    i. items e. contact information
f. hours, accepted payment methods
g. exterior photo
h. history
i. type of shop (e.g., gift, sporting goods, etc.)

III. ART
  a. Music
    i. schedule
      1. day/date/time
      2. artist
        a. albums
        b. description
        c. genre
      3. price
      4. ticket purchase locations
      5. hours of operation
      6. about/history
  b. Performing Arts
    1. day/date/time
    2. artist
      a. albums
      b. description
      c. genre
    3. price
    4. ticket purchase locations
    5. hours of operation
    6. about/history
  c. Visual Studies
    i. artist
      1. portfolio
      2. description
      3. genre
      4. dates of exhibition
    ii. hours of operation
    iii. about/history IV. FESTIVALS ART
  a. history/about
  b. contact info
  c. map of festival
    i. booths
      1. vendor
      2. products
    ii. bathrooms
    iii. stage
    iv. kids area
  d. schedule
    i. day
      1. time
        a. performer
        b. location
        c. price
        d. description

V. CITY SERVICES

VI. MAPS
  a. Graphical
    i. zoom
    ii. visually indicate route to destination
    iii. BRIEFLY describe businesses in finite geographical area
    iv. streets
    v. one-way traffic flow
    vi. North
    vii. sow all businesses of a certain type within finite geographical area
  b. written
    i. verbally indicate route to destination VII. WALKING TOURS
  a. contact info
  b. categories of tour destinations
    i. destination
      1. photos
      2. description
      3. significant dates
      4. directions
  c. timeline
    i. date ranges
      1. past events and associated destinations
  d. maps
    i. destinations within
  e. trivia games
    i. question
    ii. possible answers
    iii. walking destination to learn answers or more about a destination VIII. TRANSPORTATION
  a. parking
    i. meters
      1. map of meter types
      2. details per meter
        a. price
        b. max time
      3. availability
    ii. lots
      1. map of lot types
      2. details per lot
      3. hours of operation
      4. availability
        a. webcam
    iii. event parking
      1. changes to meter/lots for special events
    iv. parking near desired businesses or other destinations
  b. bus
    i. routes
    ii. fares
    iii. accessibility
    iv. best bus for me
      1. destination
      2. arrival time
      3. closest bus stop Content is designed to be viewed on different platforms, including: HTML on PocketPC, Flash on PocketPC, smartphones, Kiosk or laptop, Tablet PC, etc.

Wi-Fi zones are being developed around the world and many towns and other environment managers view the efforts as economic development opportunities. The embodiments of this invention provide systems and methods for establishing innovative content on wireless cloud systems, as well as methods and systems to utilize the inherent functions of a wireless cloud network as well as embodiments of the present invention, which enhances a user's experience with such a network. The embodiments of the present invention also serve to drive commerce both within and without the zone of a wireless cloud. Wireless cloud networks and the embodiments of this invention facilitate end-consumers—tourists and visitors to a finite area such as, for example, a historic or business district, shopping mall, etc.; towns, business districts, or mixed use developments; and individual business owners within a Wi-Fi zone.

More Detail

Embodiments of the present invention allow mobile users to access content (e.g., shopping, eating, art, etc.) that is location and time appropriate. Content includes store websites, opt-in mobile marketing, deals of the day, maps, transportation information (bus routes, parking, etc.), walking tours, location finding (i.e., buddy finder, Wi-Finder), etc. In one embodiment the present invention is implemented as an application service provider (ASP) model, as is known in the art. The application is web-based and requires no specialized software on the client (e.g. PDA, cell phone, laptop, etc.). Businesses within the coverage of a wireless cloud (a Wi-Fi zone) have the ability to post mobile coupons via an administrative (GUI) interface.

An exemplary model for one or more embodiments of the present invention may be, for example:

Town or Venue (Environment Manager)—pays a fixed amount to license software, and also pays a variable amount (depending upon content) for optimal customizations, and pays a fixed fee for annual support. Because they are potential customers, access to a wireless cloud network under an embodiment of the present invention is generally free to the end-consumer (potential customers). In other embodiments, there may be a service and/or use fee. Individual businesses (the content providers), in one embodiment are provided free minimum "storefront" content. They are charged, generally, a fixed fee for an advanced web site, and a small fixed fee to post coupons. Advertisers are charged a fee to post advertising, generally at pre-set levels.

As provided above, content on the wireless cloud system is generally directed toward mobile tourists and visitors to a finite area such as, for example, a historic or business district, shopping mall, etc. The environment manager licenses or purchases the software and system of the present invention. Generally, individual businesses within the wireless area do not license or purchase the software and system, though it is contemplated that one or more businesses could serve as the environment manager.

Use of an Array of Technologies

Embodiments of the present invention provide a use for Wi-Fi cloud networks that cover a defined geographical area such as, for example, a town, portion of a city, mall, etc. (e.g., a wireless cloud over the geographic area) to quickly populate that network with content about that defined geographical area. Such networks are generally location-sensitive but not necessarily location-based, which means that relevant information about a geographic area is placed online for people that are using wireless in that space to find it, though it is also accessible from outside the defined geographical area.

Another aspect of the present invention is in reference to wireless telephony, especially focusing on text messaging. Text messaging has extensive use in Europe and Asia and continues to grow in the United States. Europeans generally use a standardized method for sending these text messages, whereas in the United States there is no one set standard for text messaging. Currently, SMS, which is "short messaging system," and a newer system called MMS, "multi-media messaging system," are implemented in the United States. Presently, U.S. cellular carriers are interested in deriving new revenue streams from text messaging technologies. Embodiments of the present invention integrate the two technologies of Wi-Fi and cellular. The embodiments of the present invention allow a wireless Wi-Fi "cloud" to send information out to cell phones (wireless telephony devices) using text messaging such that these two wireless technology systems (Wi-Fi and wireless telephony) are informing each other all with the goal of getting out information about what's going on in a defined geographic area, when it's going on, and who is involved in what's going on. The embodiments of the present invention provide a way that cellular and Wi-Fi can be used together. Currently, Wi-Fi and cellular operate in different markets because if a user is using Wi-Fi, they've either got to be using a Wi-Fi enabled device such as, for example, PDA or a laptop, whereas cell phones are very prolific and almost without exception every cell phone that's sold in the United States now is capable of sending and receiving text messaging.

Integration of Technologies

The embodiments of the present invention utilize a computer program product operating on a server to communicate between the cellular provider and the Wi-Fi cloud system to send out phone messages. While text messaging can generally be used to contact a person regardless of where such person may be, the embodiments of the present invention bring "place" into the communication realm as a person is much more likely to do something specific based on what's surrounding them at any given time. Thus, the embodiments of the present invention acknowledge where a person (user) is and what that person wants to do. The embodiments of the present invention allow people (e.g., businesses) to reach individuals (e.g., users) with information about their product offerings while the users are close to the businesses' product offerings as well as providing location information regarding other users. The interface between cellular and the Wi-Fi network (cloud) involves gateways that are currently in place and make it possible to send messages over an IP network (i.e., the Internet) to cellular providers and to cellular device users that have access to that cellular provider.

Methods of Use

Figure 5:
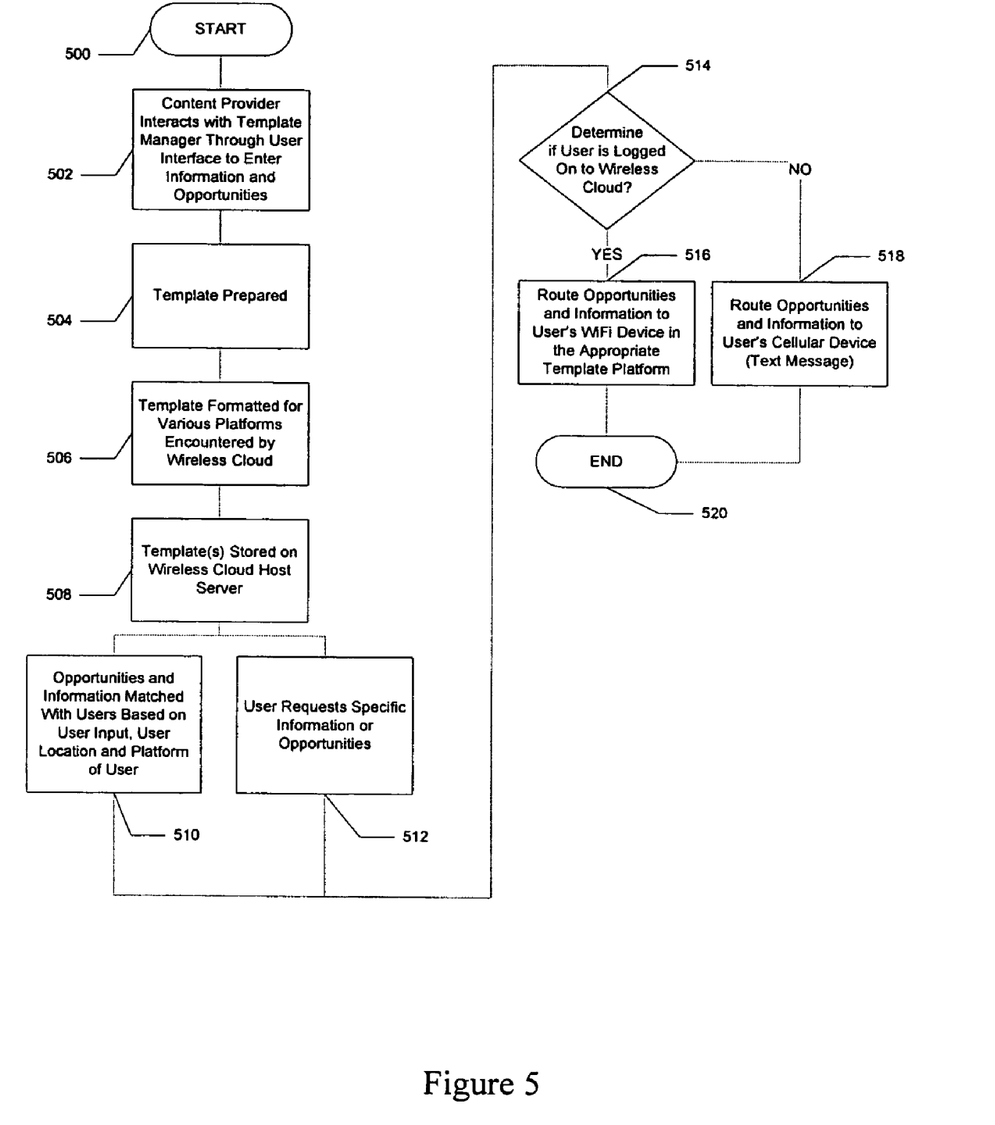
FIG. 5 illustrates an exemplary process for use of an embodiment of the system of the present invention.

FIG. 5 illustrates an exemplary process for use of an embodiment of the system of the present invention. The process starts at Step 500. At Step 502, a content provider (e.g., a business, museum, government entity, etc.) interacts with a template manager through a user interface to enter content information and opportunities. At Step 504, one or more templates are prepared based on the entered content information. The template(s) are then formatted for the various platforms that may be encountered by users of the wireless cloud at Step 506 and at Step 508, the templates are stored in memory associated with or a part of the wireless cloud host server. At Step 510, information entered in the templates is compared with user's profiles to match the information and opportunities with users based on the user's input, user's location and platform(s) of the user. Alternatively, at Step 512 information is matched to users requesting certain information or opportunities. At Step 514, it is determined whether the user is logged on to the wireless cloud system. If so, then at Step 516 the information and opportunities are routed to the user's Wi-Fi enabled device through the wireless cloud network in the appropriate template for the Wi-Fi platform utilized by the user. If, however at Step 514, the user is not logged on to the wireless cloud, then at Step 518 the information and opportunities are routed to the Internet and then through a cellular gateway to a user's cellular device in the form of a text message. The process ends at Step 520.

Figure 6:
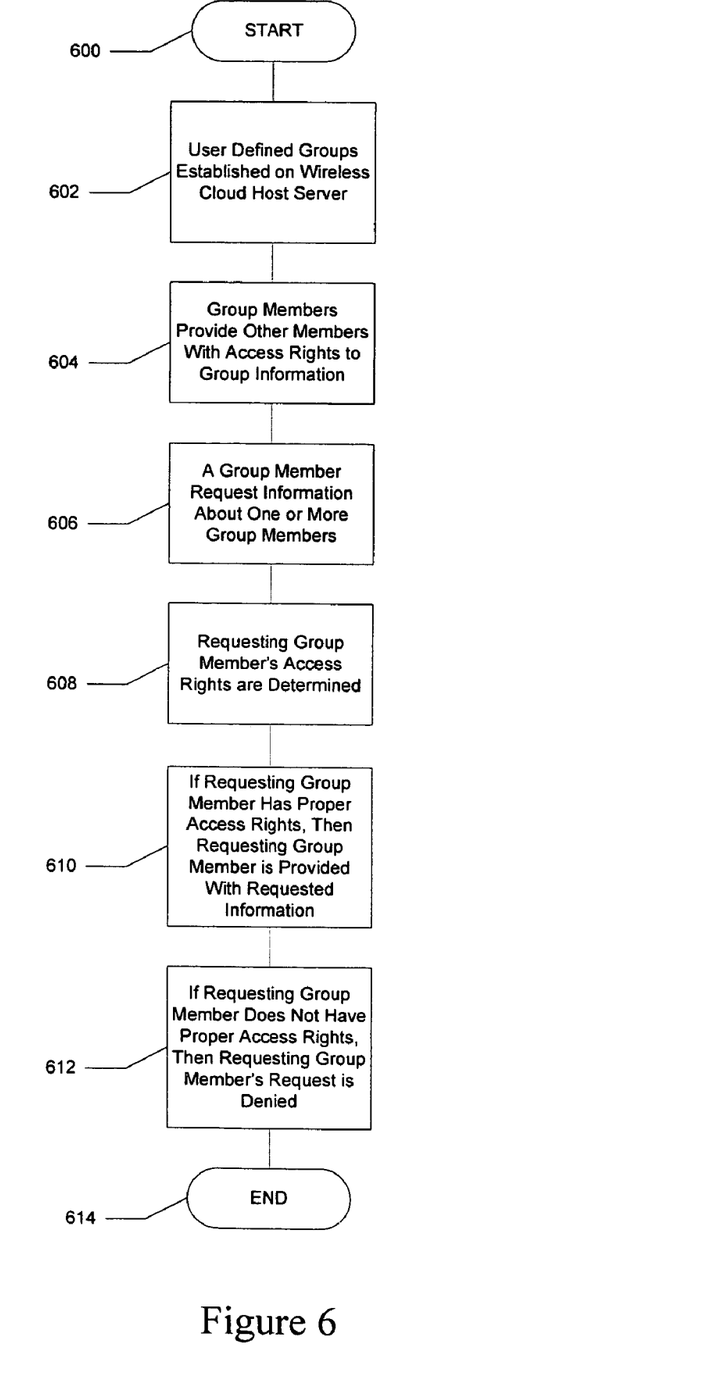
FIG. 6 is an embodiment of a process for establishing and using user-defined groups on the wireless cloud host server in an embodiment of the present invention.

As described in Step 510 of FIG. 5, in one embodiment information and opportunities are matched with pre-existing profile information that is established by a user on the wireless cloud host server. User's also have an opportunity to establish one or more user-defined groups and provide certain access rights to a user's profile information to members of those groups. FIG. 6 is an embodiment of a process for establishing and using user-defined groups on the wireless cloud host server in an embodiment of the present invention. The process starts at Step 600. At Step 602, one or more users establish user-defined groups on the wireless cloud host server. At Step 604, members of a user-defined group provide other group members with certain access rights to the member's profile information. At Step 606, a user that is a member of a user-defined group requests certain information about one or more other group members such as, for example, their locations. At Step 608, the group member that is requesting information has their access rights determined before the information is provided to the requesting group member. At Step 610, if the requesting group member has proper access rights, then the requesting group member is provided with the requested information. However, at Step 612, if the group member does not have proper access rights, then the group member's information request is denied. The process ends at Step 614.

CONCLUSION

Some of the broad inventive concepts disclosed herein in the embodiments of the present invention include but are not limited to:

Means to respond to network differences by determining how a user is accessing the wireless cloud network, so the information is then used to contact the user in the manner desired through a profile responding to the speed and cost of various networks.

Means of deriving revenue for an environment manager by offering advertising and content to businesses and users within the wireless cloud (Wi-Fi area).

Means to put an end user in control of the content that is presented to the user and also a negotiation process between the user and the system of the invention as a discount for a competing second venue may not be presented to a user while said user is located in a first venue. For instance, if a user is in a bar and has received a coupon for that bar, the user will not be contacted by another restaurant for a specified period of time or until the user has left the bar.

A modified "chat bot" computer program product operating on a server that triggers the storing and/or retrieval and presentation of certain specific information in a storage device associated with the server based on the receipt of certain specific information either via the Internet or via a cellular telephone service. Said computer program product also determines whether a user is logged on to a wireless cloud network with a wireless device and, if so, communication is routed to said device, else communication is routed to a cellular telephone associated with said user.

Means for providing location information of a user to a computer program product operating on a server associated with a wireless cloud network via a wireless device and systems and methods of receiving location information via said wireless device about one or more other users of said wireless cloud network.

Means for a Wi-Fi wireless cloud network wherein said network includes areas comprising substantial content from businesses, organizations and entities within the cloud and wherein such content is presented to users of the network by robust pre-fabricated templates having customized content supplied by said businesses, organizations and entities.

Wireless templates for use in Wi-Fi wireless cloud networks, wherein said templates are comprised of: multi-level, multi-page sites; content that is specified by the businesses utilizing the pre-fab templates; said pre-fab templates including primary templates for: food; art; shopping, etc. and secondary templates for: festivals; city services; maps; walking tours; transportation; etc. and said templates having communication features which include people finders; chat; VoIP, etc.

Means for providing wireless content to wireless devices of users of a wireless network based on the current location of a user and/or the current time of day.

Means for establishing a user profile such that only user-specified content is presented to the wireless device of a user of a wireless Wi-Fi cloud network.

A Graphical User Interface for customization of Wi-Fi templates for a wireless cloud network wherein said templates may be customized by businesses, organizations and entities within the wireless cloud for presentation to the wireless devices of users.

An end-user Graphical User Interface capable of operating on various platforms (e.g., PDAs, smart-phones, cell phones, laptops, kiosks, etc.) and capable of presenting in a designated format information that is received by said platform via a wireless cloud network.

Means for providing a user's platform via a wireless cloud network with coupons and/or discounts for businesses, organizations and entities located within said wireless cloud wherein said coupons and/or discounts are presented based on the location of the user and/or the time of day.

Means for providing graphical/textual instructions and/or directions via a wireless cloud network to a user's platform located within a wireless cloud.

Means for integrating features of a wireless platform in a wireless cloud, said features including: VoIP; instant messaging; radio frequency identification (RFID); buddy list with search and preferences; time-based content like ads, coupons, auto-payment with credit card, etc.; geographical-based searches such as, for example, "show me all businesses on this block" or "show me all Mexican restaurants with entrees under $7 within two blocks of my current location"; and geographical and time-based searches such as, for example, "show me all theaters with four blocks having movies starting between 8:00 and 9:00 p.m."

Means for providing notifications to a wireless platform via a wireless cloud network wherein said notifications are associated with businesses, organizations or entities located within the wireless cloud and/or location and time parameters, and said notifications include: restaurant table ready; parking meter about to expire; concert or other event starting; etc.

Means for using an array of wireless technologies to deliver context (location, time, and people) sensitive information to users in a defined geographic area.

A computer server executing code (a modified "chat bot") that triggers an application to store the telephone numbers and locations of users in a database associated with the server.

Means for integrating Wi-Fi and Internet-enabled devices. For instance, a server (optionally with independent data storage device for the database) that interfaces with a wireless cloud to communicate with Wi-Fi devices using a direct cloud or a cloud-Internet-cloud communication and also cell devices using a cloud-Internet-cell network pathway enabled via an Internet gateway.

However, it is to be recognized that the above concepts are not exhaustive and that any modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

What is claimed:

1. A wireless communications system comprising:
   a wireless cloud formed of one or more wireless fidelity (Wi-Fi) antennas in a defined geographical area capable of communicating wirelessly with one or more wireless fidelity enabled devices;
   a wireless cloud host server in communication with at least said wireless cloud and having an Internet connection; and
   a cellular gateway that provides communication between a wireless telephony network and wireless telephony devices and the Internet,
   wherein said wireless cloud host server is executing a modified chat bot computer program product that manages communication between the wireless telephony devices and the wireless fidelity enabled devices by communicating with said wireless telephony devices in the form of text messaging and by communicating with said wireless fidelity enabled devices in the form of web pages.

2. The wireless communication system of claim 1, wherein said text messaging uses the SMS or MMS protocol.

3. The wireless communication system of claim 1, wherein said modified chat bot computer program product operating on said wireless cloud host server triggers the storing and retrieval and presentation of information in a storage device associated with the wireless cloud host server based on the receipt by said wireless cloud host server of certain triggering information either via the Internet, a wireless telephony device or a wireless fidelity enabled device.

4. The wireless communication system of claim 3, wherein said modified chat bot computer program stores in said storage device associated with said wireless cloud host server information related to the location of a first user of said wireless cloud and said location information is provided to the wireless fidelity enabled device associated with a second user of said wireless cloud based upon a request from said second user and authorization of said second user by said first user.

5. The wireless communication system of claim 1, wherein said modified chat bot computer program product operating on said wireless cloud host server determines whether a user is logged on to the wireless cloud with at least one wireless fidelity enabled device and, if so, communication is routed to said wireless fidelity enabled device, else communication is routed to at least one wireless telephony device associated with said user.

6. The wireless communication system of claim 1, wherein said system provides a user's wireless fidelity enabled device via said wireless cloud coupons or discounts for businesses, organizations or entities located within said defined geographical area and said coupons or discounts are presented based on the location of the user or the time of day.

7. The wireless communication system of claim 1, further comprising a content provider graphical user interface (GUI) for interfacing with said wireless cloud host server, wherein said content provider GUI allows customization of wireless fidelity templates for the wireless cloud and said templates are customizable by content providers within the defined geographical area for presentation to the wireless fidelity enabled devices of users.

8. The wireless communication system of claim 7, further comprising an end-user graphical user interface (GUI) capable of operating on various platforms and capable of presenting in a designated format information that is received by said platform via the wireless cloud, wherein said platform is determined by said modified chat bot computer program product.

9. The wireless communication system of claim 8, wherein said various platforms comprise one or more of PDAs, smart-phones, cell phones, laptop computers, desktop computer and kiosks.

10. The wireless communication system of claim 8, wherein said information presented a user's platform via said wireless cloud comprises graphical or textual instructions or directions.

11. The wireless communication system of claim 1, wherein said system is used to provide one or more of the following forms of communication between a user of the wireless communication system and at least one other user:
   VoIP;
   instant messaging;
   radio frequency identification (RFID);
   buddy list with search and preferences;
   time-based content comprised of one or more of advertisements, coupons, or auto-payments using a credit card;
   geographical-based searches; and
   geographical and time-based searches.

12. A computer readable medium embodied with a computer program product comprised of code that is executable by a processor of a computer comprising:
   a first executable portion operating on said processor that determines whether a user is logged on to a wireless cloud network with a wireless fidelity enabled device and, if so, communication is routed to said wireless fidelity enabled device in the form of a web page, else communication is routed to a wireless telephony device associated with said user in the form of a text message; and
   a second executable portion operating on said processor that receives and stores certain user profile information including said user's telephone number and location in a database associated with the computer and provides said information to authorized users, said information provided in the form of web pages or text messages, depending upon whether the authorized user is logged on to the wireless cloud network or not.

13. The computer readable medium embodied with a computer program product of claim 12, wherein said computer is a wireless cloud host server.

14. The computer readable medium embodied with a computer program product of claim 12, wherein said communication routed to said wireless fidelity enabled device in the form of a web page utilizes robust pre-fabricated templates having customized content supplied by businesses, organizations and entities located within the geographic area of said wireless cloud network.

15. A method of providing content in a wireless communication network, said method comprising the steps of:
   establishing a wireless cloud network by an environment manager, wherein said wireless cloud network includes a host server and said host server executes a modified chat bot computer program product;

providing one or more content templates that are accessible via said wireless cloud network, wherein said content templates enable a content provider to customize one or more web pages of content information that is available over said wireless cloud network and said web pages contain content information relevant to said content provider and storing said templates and said content information in a memory area associated with said host server;

formatting said content information such that it may be displayed on more than one wireless fidelity enabled platform;

matching said content information with one or more end-users that have indicated an interest in said content information in a user profile established on said host server;

determining an appropriate format for the wireless fidelity enabled platform corresponding to the one or more end users and obtaining the appropriately formatted content information that corresponds to the determined platform; and transmitting said content information to the one or more end users.

16. The method of claim 15, further comprising the steps of:

receiving a request at said host server for said content information from a requesting end user;

determining an appropriate format for the wireless fidelity enabled platform making the request and obtaining the appropriately formatted content information that corresponds to the determined platform; and transmitting said content information to the requesting end user.

17. The method of claim 16 wherein before transmitting said content information to the requesting end user, a computer program product on said host server determines whether said requesting end user is logged onto said wireless cloud network and if said requesting user is not logged on to said wireless cloud network, said content information is transmitted to a wireless telephony device associated with said requesting user in the form of a text message.

18. A method of using wireless templates in providing content in wireless cloud networks, said method comprising the steps of:

providing prefabricated templates that are accessible over a network, wherein said prefabricated templates are comprised of one or more of primary templates, secondary templates, and communication features;

receiving from content providers that are located within the geographical coverage area of a wireless cloud network the content to form populated prefabricated templates;

providing an end-user graphical user interface capable of operating on various platforms and capable of presenting in a designated format at least a portion of the content of a populated prefabricated template, wherein said information is received by said platform via the wireless cloud network; and providing at least a portion of said content from said populated prefabricated templates to wireless fidelity enabled devices associated with end users of the wireless cloud network based on the current location of the end user or the current time of day.

19. The method of claim 18, wherein the primary templates are for one or more of food, art, or shopping.

20. The method of claim 18, wherein the secondary templates are for one or more of festivals, city services, maps, walking tours or transportation.

21. The method of claim 18, wherein the communications features are for one or more of people finders, chat, or VoIP.

22. The method of claim 18, further comprising the step of establishing an end user profile on said wireless cloud network such that only end user-specified content that is comprised of at least a portion of said content from said populated prefabricated templates is presented to a wireless fidelity enabled device associated with the end user of a wireless cloud network.

23. The method of claim 18, wherein the step of receiving from content providers that are located within the geographical coverage area of a wireless cloud network the content to form populated prefabricated templates comprises a graphical user interface for customization of said prefabricated templates.

24. The method of claim 18, wherein said platforms include one or more of PDAs, smart-phones, cell phones, laptop computers, desktop computers, or kiosks.

25. The system of claim 18, wherein providing at least a portion of said content from said populated prefabricated templates to wireless fidelity enabled devices associated with end users of the wireless cloud network based on the current location of the end user or the current time of day comprises providing graphical or textual instructions or directions.

26. A method of providing content in a wireless communication network, said method comprising the steps of:

establishing a wireless cloud network by an environment manager, wherein said wireless cloud network includes a host server and said host server executes a modified chat bot computer program product;

providing one or more content templates that are accessible via said wireless cloud network, wherein said content templates enable a content provider to customize one or more web pages of content information that is available over said wireless cloud network and said web pages contain content information relevant to said content provider and storing said templates and said content information in a memory area associated with said host server;

formatting said content information such that it may be displayed on more than one wireless fidelity enabled platform;

determining an appropriate format for the wireless fidelity enabled platform corresponding to one or more end users of said wireless communication network, obtaining the appropriately formatted content information that corresponds to the determined platform; and transmitting said content information to the one or more end users.

27. The method of claim 26, wherein before transmitting said content information to the one or more end users, a computer program product on said host server determines whether a certain end user is logged onto said wireless cloud network and if said end user is not logged on to said wireless cloud network, said content information is transmitted to a wireless telephony device associated with said end user in the form of a text message.

* * * * *